No. 765,724.

Patented July 26, 1904.

UNITED STATES PATENT OFFICE.

HERBERT B. ATHA, OF EAST ORANGE, NEW JERSEY.

TREATING SCRAP-STEEL AND RECARBURIZING SAME.

SPECIFICATION forming part of Letters Patent No. 765,724, dated July 26, 1904.

Application filed January 18, 1904. Serial No. 189,606. (No specimens.)

*To all whom it may concern:*

Be it known that I, HERBERT B. ATHA, residing at East Orange, in the county of Essex and State of New Jersey, have invented certain new and useful Improvements in Treating Scrap-Steel and Recarburizing the Same, of which the following is a full, clear, and exact description, such as will enable others skilled in the art to which it appertains to make and use the same.

It is a well-known fact that scrap-steel contains a small amount of carbon, and therefore it cannot be converted into a high-grade commercial steel without recarburization in a furnace. Heretofore attempts have been made to recarburize such scrap-steel by putting coke into the furnace with the scrap-steel. This way of recarburizing, however, was found to be unsatisfactory, because the carbon in the coke was driven off before the scrap was heated to a temperature sufficiently high to absorb the carbon in the coke. Subsequently another attempt was made to recarburize such scrap by putting pig-iron into the furnace with the scrap. So far as recarburization is concerned this method has been fairly successful; but it is expensive.

One of the objects of my invention is to recarburize scrap-steel and to reproduce from it a high-grade commercial steel in an efficient and cheap manner.

Another object is to so prepare the scrap-steel before placing into the furnace that it can be easily and cheaply handled before and when it is being placed in the open-hearth furnace.

Other objects will appear from the hereinafter description.

After experimenting I have found that scrap-steel can be successfully prepared for placing in the furnace with little expense, and it can be more successfully and more cheaply recarburized by my present process than by the prior processes, and the steel obtained from my process is of as high a grade and it commands as high a price as that made by other processes.

In carrying out my invention I thoroughly mix with the scrap-steel before placing it in the furnace finely-divided carbon and then press the scrap having the finely-divided carbon intimately mixed with it into bundles. The finely-divided carbon may be mixed and kept in contact with the scrap-steel in various ways. The most effective way is to place the finely-divided carbon into small bags or sacks, mix the sacks through the scrap-steel, and press the two into bundles formed into cubes of about two feet in dimension. Another way of forming these packages or bundles is to sprinkle the finely-divided carbon through the scrap and press it into cubes, as before. Another way is to prepare a liquid-bearing carbon and throw the scrap into this liquid before it is compressed. The carbon will adhere to the surface of the scrap, and when the scrap is pressed into cubes the carbon will be intimately mixed throughout the bundles. In some cases the bundles may be formed first and then placed in a tank or vessel containing the carbon-bearing liquid. The liquid then permeates the bundles, and the carbon will deposit and adhere to the pieces of scrap throughout the bundles. The bundles so prepared having the carbon intimately mixed throughout are now placed in the furnace. The carbon being intimately mixed throughout the bundles is not driven off before the temperature of the steel scrap is raised sufficiently high to absorb the carbon. The carbon is therefore not driven off; but practically all of it is absorbed by the steel, it being a well-known fact that the steel when it is raised to a certain temperature acts as a sponge to absorb the carbon that is in contact with it.

By my process as above described I recarburize the steel at less expense than has heretofore been done and obtain a product, a high-grade commercial steel, of uniform quality throughout. I have also found out that bundles of scrap-steel having the finely-divided carbon intimately mixed with it and pressed into bundles as above described makes an excellent substitute for pig-iron to be used in an open-hearth furnace. It is as easily handled as pig-iron, and it is less expensive.

While I have herein described certain steps for carrying out my process, yet it will be clear to any one skilled in the art that it may be varied within certain limits without departing from my invention.

Having described my invention, what I claim as new, and desire to secure by Letters Patent, is—

1. The herein-described process for preparing scrap-steel for remelting in an open-hearth furnace, which consists in intimately mixing with the scrap-steel finely-divided carbon.

2. The herein-described process for preparing scrap-steel for remelting in an open-hearth furnace, which consists in intimately mixing with the scrap-steel finely-divided carbon and pressing the mixture into bundles.

3. As a new and improved product, a bundle of scrap-steel having finely-divided carbon intimately mixed with the scrap.

4. As a new and improved product, a bundle of scrap-steel having on the surface of the different pieces of the scrap-steel a coating of finely-divided carbon.

5. The herein-described process of recarburizing scrap-steel, which consists in intimately mixing finely-divided carbon with the scrap-steel and placing the intimately-mixed scrap and carbon in an open-hearth furnace and raising the temperature of the steel in the furnace to a point where it will absorb the carbon.

6. The herein-described process for recarburizing scrap-steel, which consists in intimately mixing finely-divided carbon with the scrap-steel, pressing the two into bundles, placing the bundles in an open-hearth furnace and raising the temperature of the furnace to such a point that the steel will absorb the carbon.

7. The herein-described process of recarburizing scrap-steel, which consists in applying to the surface of the scrap a coating of finely-divided carbon, throwing the scrap so treated into an open-hearth furnace and raising the temperature of the furnace to such a point that the steel will absorb the coating of carbon.

8. The herein-described process of recarburizing scrap-steel, which consists in placing in an open-hearth furnace scrap-steel and placing in the furnace with such steel scrap-steel having finely-divided carbon intimately mixed therewith and then raising the temperature of the entire charge in the furnace to such a point that the carbon mixed with the scrap-steel lastly placed in the furnace will be absorbed by the whole charge.

9. The herein-described process of recarburizing scrap-steel, which consists in placing such steel in an open-hearth furnace, then placing in the furnace with such steel bundles of scrap-steel and intimately-mixed finely-divided carbon and raising the temperature of all the steel in the furnace to such a point that the finely-divided carbon in the bundles of scrap-steel will be absorbed by the entire charge of steel in the furnace.

10. As a new and improved product, a bundle of scrap-steel having on the surface of the different pieces of the scrap forming the bundle a film of finely-divided carbon.

11. As a new and improved product, pieces of scrap-steel having on the surface thereof a film of finely-divided carbon, the said pieces of scrap being pressed together into a bundle.

12. As a new and improved product, a bundle of scrap-steel having on the surface of the different pieces of scrap forming the bundles particles of finely-divided carbon adhering thereto.

13. The herein-described process for preparing scrap-steel for remelting in an open-hearth furnace, which consists in mixing with the scrap-steel carbon and pressing the mixture into bundles.

14. As a new and improved product, a bundle of scrap-steel having carbon intimately mixed with the scrap.

15. As a new and improved product, a bundle of scrap-steel having on the surface of the different pieces of the scrap a coating of carbon.

16. As a new and improved product, pieces of scrap-steel having on the surface thereof a film of carbon, the said pieces of scrap with the film of carbon thereon being pressed into a bundle.

In testimony whereof I affix my signature in the presence of two witnesses.

HERBERT B. ATHA.

Witnesses:
LOTTA STREVELL,
ALLAN W. FOOSE.